Oct. 30, 1945.  G. L. MOELLER  2,388,006
COMMUTATOR STRUCTURE AND METHOD OF MANUFACTURE THEREOF

Filed Aug. 4, 1943

INVENTOR.
George L. Moeller
BY Bair & Freeman
Attys

Patented Oct. 30, 1945

2,388,006

UNITED STATES PATENT OFFICE 2,388,006

COMMUTATOR STRUCTURE AND METHOD OF MANUFACTURE THEREOF

George L. Moeller, St. Louis, Mo., assignor to Knapp-Monarch Company, St. Louis, Mo., a corporation of Missouri Application August 4, 1943, Serial No. 497,349

5 Claims. (Cl. 171—321)

My present invention relates to a commutator structure and a method of manufacturing the same whereby I am able to produce a relatively inexpensive commutator of great resistance to disintegration by centrifugal force.

One object of the invention is to provide a commutator in which the segments or commutator bars may be formed of sheet metal stampings, preferably of course copper sheet.

Another object is to provide a commutator in which the segments are initially formed together so that they are accurately positioned with relation to each other and thereafter the core is molded in and around the segments.

A further object is to provide a commutator which may be thus formed and then the segments electrically isolated from each other by merely sawing or otherwise cutting through portions of the laminae down to the molded core. Still a further object is to provide a commutator construction which may be manufactured by a method that insures accurate alignment of the commutator segments due to their integral initial state, after which the steps of molding a core for the commutator and separating the segments by machining slots between them completes the commutator and produces one which has many inherent advantages as will hereinafter appear.

With these and other objects in view my invention consists in the construction, arrangement, and combination of the various parts of the commutator and in the steps of a method for forming the same whereby the objects contemplated are attained as hereinafter more fully set forth, pointed out in my claims, and illustrated in the accompanying drawing. Although the invention is susceptible of a variety of embodiments and a method of forming the commutator may be varied to some extent, it is unnecessary to fully describe and illustrate more than one embodiment of the structure and one method in order to give a full understanding of the invention from its structural, functional, and operational standpoints. Accordingly I have illustrated a preferred and desired embodiment thereof on the accompanying drawing in which:

Figure 5:
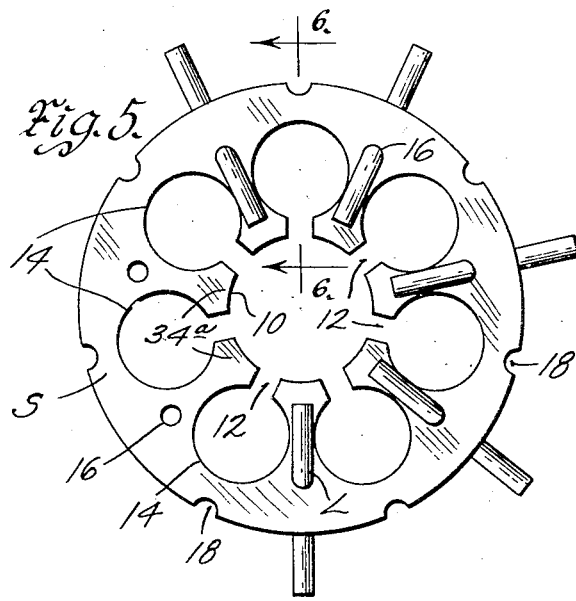
Figure 5 is a front elevation of the laminae and commutator leads assembled with the exception of two leads being omitted in order to show one of the steps in my method.
Figure 6:
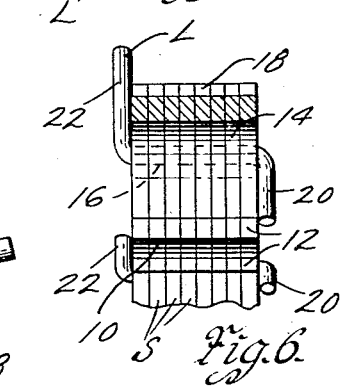
Figure 6 is a sectional view on the line 6—6 of Figure 5.

On the accompanying drawing I have used the reference character S to indicate a stack of laminae which in their initial shape as shown in Figure 5, provide a substantially washer-like element with certain modifications which will now be described. The center opening of the washer is indicated at 10 and connected with this opening by slots 12 are core receiving openings 14. Between the core receiving openings I provide commutator lead openings 16 and adjacent the outer edges of the openings 14 I provide notches 18.

These laminae may be individually stamped from sheet copper thus making them relatively inexpensive to fabricate. On the other hand, the segment element may be cast or forged of solid metal if such is more desirable than making it of a plurality of laminae.

Commutator leads L extend through the openings 16 and have inwardly and outwardly bent terminal ends indicated at 20 and 22 respectively. During the process of manufacture these leads are inserted through the stack of laminae after one of the ends is properly bent and then the other end is bent, as to the shape shown in Figure 3, following which the entire assembly of laminae and commutator leads may be dipped in solder for providing good electrical connection between them. As an alternative, the commutator leads may be sweated into position and the ends 20 and 22 individually soldered or brazed.

Figure 3:
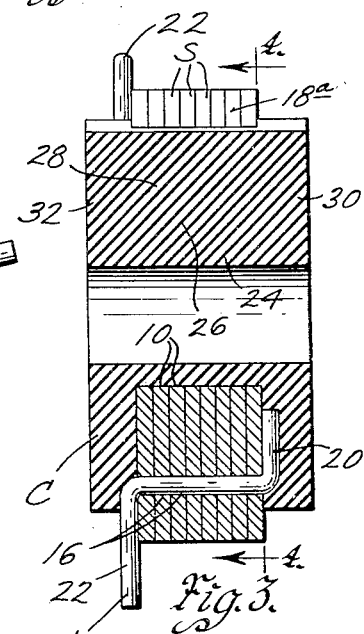
Figure 3 is an enlarged sectional view on the line 3—3 of Figure 1.

A core C is provided for the commutator and this core is molded into the assembly shown in Figure 5 after the remaining two commutator leads omitted from the left side of the figure are assembled. The molding dies are of the proper shape to cause a hub portion 24 of the core to line the central opening 10 of the stack of laminae, another portion to fill the slots 12 as shown at 26, a third portion to fill the core receiving openings 14 as shown at 28 and still other portions to provide flanges 30 and 32 on the opposite faces of the stack of laminae. As shown adjacent the notch 18 in Figure 4, the core portion 28 completely fills the opening 14. The core portions 26 and 28 as well as the core portion 24 extend all the way from the flange 30 to the flange 32 and these parts are all integral with relation to each other as shown in Figure 3 (upper half).

Figure 1:
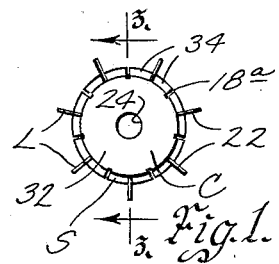
Figure 1 is a front elevation of a commutator structure embodying my invention, the commutator being shown full size, although of course its size may be either increased or decreased and yet obtain the same advantages.
Figure 2:
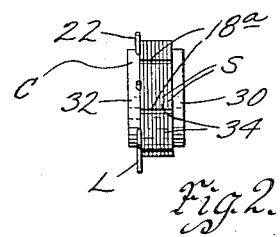
Figure 2 is a side elevation of the commutator.
Figure 4:
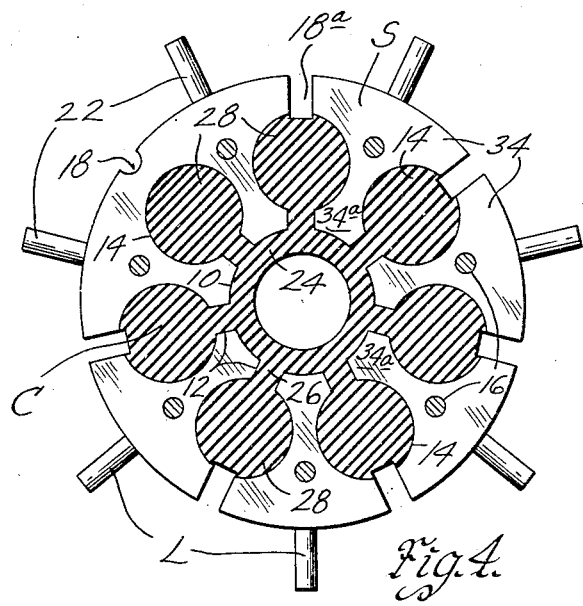
Figure 4 is a sectional view on the line 4—4 of Figure 3, with one of the slots between two of the segments uncut.

After the core C is molded, slots 18 are sawed or milled into the stack of laminae at each notch 18 as shown at the remaining six notches of Figure 4 whereby the stack of laminae S is divided into a plurality of electrically isolated segments 34. The slots 18ª extend inwardly just far enough to cut through all of the metal and slightly into the core. The resulting structure is a commutator wherein the segments are securely anchored against centrifugal force due to high speed rotation of the commutator because each segment 34 has an enlarged head-like element 34ª (see Figure 4) interlocked between the two adjacent core portions 28. The core portions 28 in turn are amply supported against outward movement under the action of centrifugal force by the portions 26 connected to the hub portion 24 and by the flanges 30 and 32 connected with the ends of the portions 28 and with the ends of the portions 24 and 26 of the core.

From the foregoing specification it is obvious that I have provided a commutator structure which is inexpensive to manufacture, particularly because the commutator segments may be formed of sheet metal stampings and the core molded into an interlocking relationship therewith. The steps of the method are relatively few, involving only one machining operation—that of cutting the slots 18ª. This operation electrically isolates the segments from each other whereas they were initially connected together for accuracy in their position to each other during the core forming step of the process. Obviously a final finishing operation may be performed on the periphery of the completed commutator if necessary or desired.

Some changes may be made in the construction and arrangement of the parts of my commutator and the steps of my method may be varied within the scope of the appended claims without departing from the real spirit and purpose of my invention. It is therefore my intention to cover by my claims any modified forms or structure or use of mechanical equivalents or equivalent methods which may be reasonably included within their scope.

I claim as my invention:

1. A commutator structure comprising commutator segments, each having indentations in opposite sides, a molded core for said segments having portions extending into said indentations to retain the segments against outward movement by centrifugal force, said core having flanges on opposite faces of said segments, said flanges connecting said portions together to form a unitary core for the commutator, and commutator leads through said segments and having opposite ends bent against the ends of said segments.

2. In a commutator structure, a stack of laminae to form the commutator segments, said stack having core receiving openings between the segments and slots from said core receiving openings to the central opening of the stack, a commutator lead for each segment, said leads extending through the stack and each having its respective ends bent to extend substantially radially inward and substantially radially outward and closely adjacent the end laminae of the stack, a core lining said central opening, extending through said core receiving openings and said slots, and having flanges on opposite faces of said stack of laminae, said flanges imbedding said inwardly extending and outwardly extending ends of said commutator leads, said stack of laminae being cut through between each segment to said portions of said core in said core receiving openings to electrically isolate the segments from each other.

3. In a commutator structure elements to form the commutator segments, said elements having core receiving openings therebetween and slots from said core receiving openings to a central opening of the elements, a commutator lead for each segment, said leads extending through the elements and each having its ends bent to extend inward and outward, respectively, a core lining said central opening, extending through said core receiving openings and said slots, and having flanges on opposite faces of said elements, said flanges imbedding said inwardly extending ends and the inner end portions of said outwardly extending ends of said commutator leads, said elements being cut through between each segment to said portions of said core in said core receiving openings to electrically isolate the segments from each other.

4. In a commutator structure, a stack of laminae to form the commutator segments, said stack having core receiving openings between the segments and slots from said core receiving openings to the central opening and to the periphery of the stack, a commutator lead for each segment, said leads extending through the stack and each having its respective ends bent to extend substantially radially inward and substantially radially outward, and closely adjacent the end laminae of the stack and a core lining said central openings, and extending through said core receiving openings and said first slots.

5. In a commutator structure, elements to form the commutator segments, said elements having core receiving openings therebetween and slots from said core receiving openings to a central opening of the elements, and a commutator lead for each segment, said leads extending axially through the elements and each having an outwardly bent end, a core of insulating material lining said central opening, extending through said core receiving openings and said slots, and having flanges on opposite faces of said elements, one of said flanges embedding said commutator leads to retain them in position, said elements being cut through between each segment to said portions of said core in said core receiving openings to electrically isolate the segments from each other.

GEORGE L. MOELLER.